United States Patent [19]

Dorsey et al.

[11] 3,854,006

[45] Dec. 10, 1974

[54] SWITCHABLE VIDEO AMPLIFIER

[75] Inventors: Denis Peter Dorsey, Levittown, Pa.; William E. Rodda, Trenton; Kenneth Bruce Bahrs, Bricktown, both of N.J.

[73] Assignee: RCA Corporation, New York, N.Y.

[22] Filed: Oct. 23, 1973

[21] Appl. No.: 408,304

[52] U.S. Cl....... 178/6.8, 178/DIG. 3, 178/DIG. 24, 179/2 TV, 315/13 ST, 330/29

[51] Int. Cl........................... H04n 5/68, H04n 7/12

[58] Field of Search............ 178/5.6, 6, 6.8, DIG. 3, 178/DIG. 24; 315/12, 13 ST, 21 MR, 22; 330/17, 22, 28, 29; 179/2 TV

[56] References Cited

UNITED STATES PATENTS

| | | | |
|---|---|---|---|
| 2,629,010 | 2/1953 | Graham | 178/DIG. 3 |
| 3,628,166 | 12/1971 | Harford | 330/29 |

*Primary Examiner*—Howard W. Britton

*Attorney, Agent, or Firm*—Eugene M. Whitacre; Charles I. Brodsky

[57] ABSTRACT

A video frequency amplifier is biased to provide output signals of a first magnitude. In response to the application of a predetermined control signal, the bias is altered so that output signals are provided of a second, different magnitude. When employed in communications systems of the type in which television images are "frozen" by a storage tube for subsequent transmission on an individual frame basis by a voice-quality telephone link, for example, and subsequently recreated, the control signal indicates whether the system and its storage tube are to operate either in the "transmit" or "receive" mode. Power dissipation is kept low by energizing the amplifier only during those times when input signals are applied for amplification.

5 Claims, 1 Drawing Figure

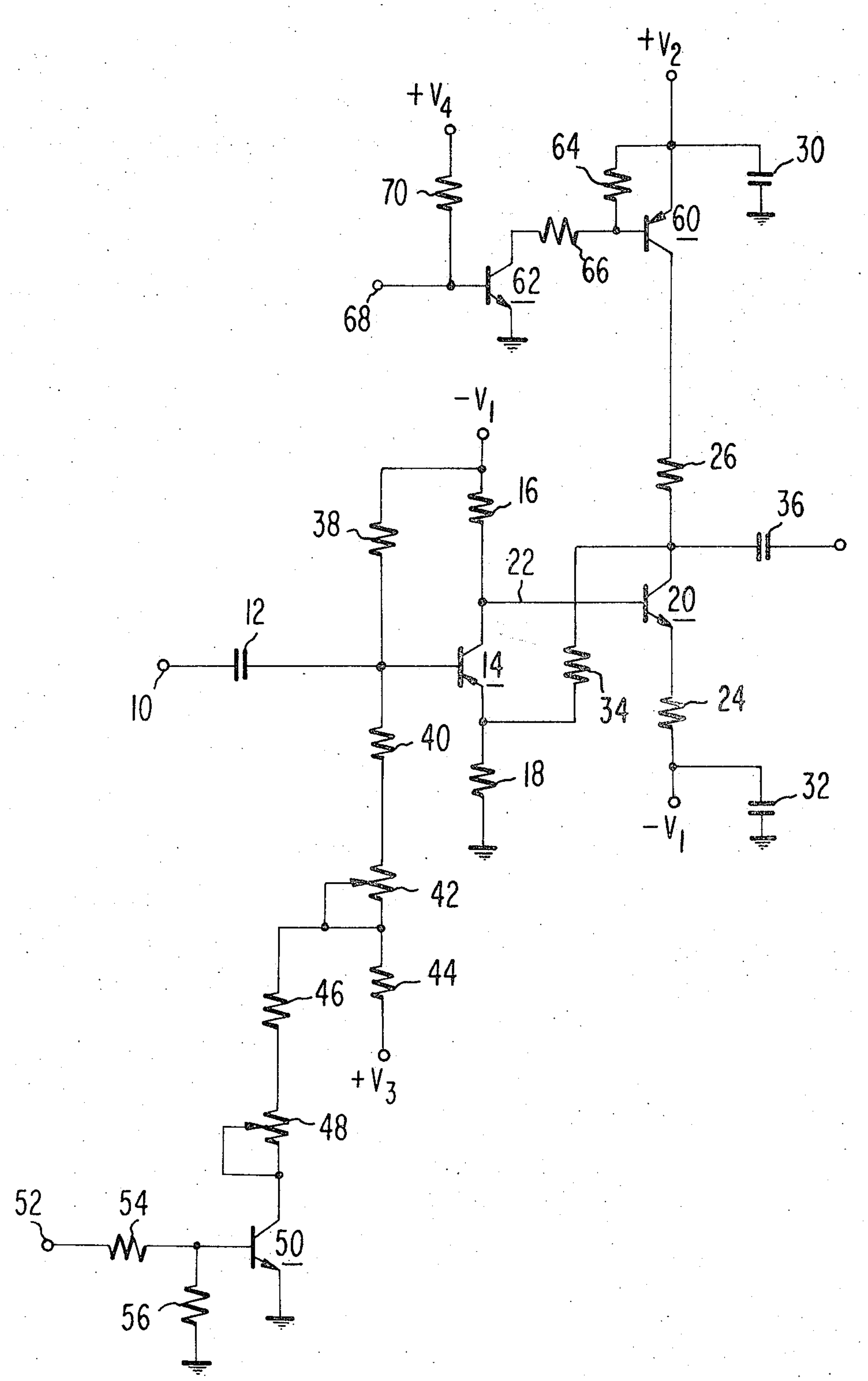
+V2
+V4
64
30
70
60
62
66
68
-V1
16
26
36
38
22
20
12
14
34
24
10
40
18
32
-V1
42
44
46
+V3
48
52
54
50
56

SWITCHABLE VIDEO AMPLIFIER

FIELD OF THE INVENTION

Pending U.S. Pat. application Ser. No. 257,412, filed May 26, 1972, and entitled "TELEPHONE IMAGE TRANSMISSION SYSTEM" describes a system which is capable of transmitting still television pictures of three-dimensional objects over communications channels such as long-distance unequalized voice-grade telephone lines. A television camera is therein employed to continually provide a video signal to a storage tube in which one video frame of information can be "frozen" when an accompanying monitor indicates that the picture desired to be transmitted is then being picked up by the camera. The single frame stored is then converted to an audio frequency signal for transmission over audio channels to a remote receiver location where a second storage tube is used to record the audio frequency information transmitted. Upon completion of the transmission, the audio information stored is converted back to a video signal for viewing on a second monitor.

Such a transmission system has been termed "simplex," in that transmissions always travel in the same direction along the audio link. In a "half-duplex" system, on the other hand, transmissions can proceed in either direction, but not simultaneously. Experimentation has shown that "half-duplex" system performance can be enhanced when the storage tube is biased to a first condition when the "transmit" mode of operation is intended and to a second, different condition when the "receive" mode of operation is desired.

To be more specific, when the storage tube is used to "freeze" a television frame for transmission, substantially the entire television picture is scanned and thereby stored across its target area in approximately one-thirtieth of a second. When the storage tube is used instead to re-create a transmission received by it from the telephone line, the amplitude modulated pulses received via the audio communications link complete the recording of the frame information in approximately 60 seconds. Each element of the storage tube target need be contacted only once to store the "frozen" picture before subsequent transmission; similarly, each element must be scanned only once during the receipt mode of operation to assure that the entire frame information will be available at the end of the 60 second period. It will be appreciated, therefore, that unless the bias voltage for the storage tube were substantially lower in the "receive-re-create" mode as contrasted with the "select-transmit" mode, then over the 60 second period, a series of charges would tend to accumulate on the target elements of the storage tube and would ultimately reduce the amount of usable information which could be laid down. It will similarly be appreciated that any resulting change thus made in bias voltage necessitates a concomitant increase in applied signal level for correct storage tube operation to continue.

Pending U.S. Pat. application Ser. No. 337,012, filed Mar. 1, 1973, and entitled "DUAL BIAS CONTROLLED STORAGE TUBES" describes a circuit construction for increasing the bias on the control grid of the storage tube at the time it is being used to reproduce a received transmission. Pending U.S. Pat. application Ser. No. 398,853, filed Sept. 19, 1973, and entitled "VIDEO FREQUENCY AMPLIFIER OPERABLE IN EITHER OF TWO BIAS CONDITIONS", a continuation-in-part application of U.S. Pat. Ser. No. 273,534, filed July 20, 1972, now abandoned, describes a circuit construction for increasing the amplitude of the output signal to write into the storage tube when the changeover from the "transmit" to the "receive" mode of operation occurs.

SUMMARY OF THE INVENTION

As will become clear hereinafter, the present invention represents a modification of the U.S. Pat. Ser. No. 398,853 construction in that it restricts the energization of its video amplifier only to those intervals during which the output signals developed are to be used to write into the storage tube. To this end, a second control signal is developed—in addition to one which indicates whether the storage tube is to operate in its "receive-re-create" mode or in its "select-transmit" mode—for use in applying energizing potentials to the output video amplifier to provide its developed signals at the desired times.

Experimentation has shown that in order to provide the large amplitude output signals needed to write into the storage tube during the "receive" mode of operation, a low amplifier load impedance and a high energizing potential are required. During the times when the amplifier is not being called upon to write into storage, however, the quiescent power dissipation and resultant high temperatures with this arrangement would be such as to cause significant problems of drift, both in amplifier operation and in the development of the various control voltages which require critical regulation for correct storage tube operation to result. As will be seen, this added control of the video amplifier stage is effected by coupling to it the high supply voltage as an energizing potential during the writing interval mode and to de-couple that potential for other conditions.

BRIEF DESCRIPTION OF THE DRAWING

These and other features of the present invention will be more clearly understood from a consideration of the following description taken in connection with the accompanying drawing which shows a preferred embodiment of a video frequency amplifier, switchable in operation, according to the teachings of the invention.

DETAILED DESCRIPTION OF THE DRAWING

In the drawing, the signal to be stored—either from the television camera prior to transmission as a "frame-freeze" image or from the audio communications link telephone line to be re-created—is applied via an input terminal 10 and a capacitor 12 to the base electrode of a first transistor 14, shown as being of P-N-P type. The collector electrode of transistor 14 is coupled via a resistor 16 to a first source of operating potential $-V_1$, while its emitter electrode is coupled via a resistor 18 to a point of reference or ground potential. A second transistor 20, of N-P-N type, is also included, with its base electrode being directly coupled by means of a link 22 to the collector electrode of transistor 14 and with its emitter electrode being coupled by means of a resistor 24 to the $-V_1$ potential source. A resistor 26 serially couples the collector electrode of transistor 20 to a second source of operating potential $+V_2$, in a manner more specifically described below, which source is bypassed to ground by a capacitor 30, a similar capacitor 32 being included to bypass the $-V_1$ source to ground, also. Negative feedback around the two transistor stages is provided by means of a resistor 34 which couples the collector electrode of transistor 20 to the emitter electrode of transistor 14. A capacitor 36 is included to couple the collector electrode of transistor 20 via an output terminal 58 to the control grid electrode of the storage tube, by means of a direct current restorer circuit and follower stage (not shown) to provide drive for the tube and add a proper direct current bias level for its operation.

In accordance with the invention of the U.S. Pat. Ser. No. 398,853 application, a pair of resistive divider circuits are further included to bias the transistor stages 14 and 20 to either one of two conditions. The first divider circuit includes the series connection of resistor 38, resistor 40, variable resistor 42 and resistor 44 coupled between the $-V_1$ potential source and a third potential source $+V_3$, with the junction between resistors 38, 40 being directly connected to the base electrode of transistor 14. The second divider circuit, on the other hand, includes resistor 46 and variable resistor 48, serially coupled between the junction between resistors 42, 44 and the collector electrode of a third transistor 50, the emitter electrode of which is grounded.

Control signals for the transistor 50—of N-P-N type—are applied at a terminal 52 and coupled to the base electrode of this transistor by a resistive divider network including resistors 54 and 56. Such control signals are to place transistor 50 in one of two states of conductivity depending upon whether the storage tube system is being used to select and transmit television frame information, or to receive and re-create such information communicated along the audio link. In accordance with the teachings of the U.S. Pat. Ser. No. 398,853 invention, the first divider circuit is effective to establish a bias voltage for the illustrated amplifier to provide Class A operation whereas the second divider circuit is responsive to the control signals applied at terminal 52 to alter the bias voltage when transistor 50 conducts to provide Class B operation for the amplifier.

In this respect, the arrangement of the drawing as so far described essentially comprises a cascade connected feedback pair with a P-N-P transistor amplifier stage driving an N-P-N transistor power stage. The negative voltage feedback provided by resistor 34 is such as to make the output signal an exact replica of the input signal, whereas the variable resistors 42 and 48 serve to control the linear operation point of the N-P-N power stage. Appropriate logic circuitry (not shown) is incorporated to sense the mode of storage tube operation either to render transistor 50 nonconductive during the "frame-freeze" select mode of operation or to render it conductive during the "audio-link" re-create mode. During the "frame-freeze" select condition, the direct voltage developed at the collector electrode of transistor 20 is set by the values of divider circuit resistors 38, 40, 42, 44 and the values of potential sources $-V_1$ and $+V_3$ at approximately +10 volts with respect to ground. Linear-Class A operation of the amplifier results at this voltage setting, and a video modulating signal of some 10 volts peak-to-peak is developed by transistor 20, the most positive excursions extending to "white" in the image signal and the most negative excursions extending to "black." The direct current restorer and follower circuit which subsequently couple transistor 20 to the control grid of the storage tube operate to bias that electrode at approximately −65 volts, also measured against ground, such that "white," at the storage tube grid, corresponds to a substantial −55 volt level, while "black" corresponds to a substantial −65 volt level.

As is also described in the 398,853 case, the accumulation of charge which might otherwise develop on the target element of the storage tube when that device would be operating instead in its "audio-link" re-create mode is reduced by changing the bias on the control grid electrode from this −65 volt level to a −100 volt level. At the same time, the applied signal swing at the collector electrode of transistor 20 is increased from its previous 10 volt amount to approximately a 45 volt amplitude to overcome the change in bias, in causing the storage tube to conduct. This latter objective of increasing the dynamic range provided follows a change being made in the bias condition of the amplifier, which change is in a direction to reduce the direct current quiescent level at the collector electrode of transistor 20 from the previous +10 volts towards 0 volts. Noting that the transistor 50 becomes conductive at this time, by the application of a positive control signal at terminal 52 when the switchover to the audio communications mode of operation occurs, the resistor divider 46, 48 then serves to effect the desired change in bias level at the base electrode of transistor 14. While the feedback continues to limit the signal swing at the collector electrode of transistor 20, the ensuing result with this arrangement increasing the bias on transistor 14 and reducing the direct current level at the collector of transistor 20, permits the developed signal swing to increase from about 10 volts to about 45 volts. At the same time, the change from a Class A to a Class B type operation of the amplifier occurs once this direct current level is changed from +10 volts to approximately 0 volts, but such change does not have any substantial effect on the reproduction of the image signals eventually re-created on the storage tube target—i.e., the most positive signal excursions still extend to "white" at the storage tube grid, at a substantially −55 volts level, while the most negative excursions extend to "black" at a −100 volt setting.

As thus far described, the video frequency amplifier of the drawing is substantially identical to that disclosed in the U.S. Pat. Ser. No. 398,853 pending application. In one construction of that amplifier, resistor 26 was selected of low impedance, e.g., 1,500 ohms, and potential source $+V_2$ was selected of high voltage, 75 volts, in order to maintain wide bandwidth while providing these high voltage swings. It will be readily apparent that if this 75 volt direct current supply were directly connected to the resistor 26, the quiescent power which would be dissipated in the transistor 20 stage would be nearly 3 watts. Over a period of time, not only could this dissipation cause a serious drift problem in the transistors of the illustrated amplifier, but could also cause variations in other stages which might be physically adjacent on a video circuit module on which the amplifier is constructed, to affect the overall operating voltages and drive conditions for the storage tube. Because operation of the storage tube is quite critical in nature—requiring among other things close tolerances over control grid, focusing and target electrode voltages, as well as writing amplitudes—problems resulting from the high temperatures thus generated could very well result in deleterious writing operations. In accordance with the instant invention, however, the power dissipation duty cycle is greatly reduced by energizing the output stage transistor 20 only during the actual writing intervals of the storage tube, thereby drastically reducing the possibility of any ensuing drift.

Thus, also included in the video amplifier stage of the drawing are two additional transistors 60, 62. The first transistor 60—of P-N-P variety—has its collector electrode connected to the end of resistor 26 remote from transistor 20 and its emitter electrode connected to the $+V_2$ source. The base electrode of transistor 60 is coupled, first, by a resistor 64 to the $+V_2$ source and, second, by means of a resistor 66 to the collector electrode of the transistor 62, shown of N-P-N type. With the emitter electrode of this transistor connected to ground and with its base electrode coupled to an input terminal 68 to receive a second control signal indicating whether the storage tube is to be placed in a "write," "read" or "erase" mode of operation, the amplifier of the drawing is completed by the inclusion of an additional resistor 70 coupled between a $+V_4$ source of operating potential and the base electrode of transistor 62.

As will be appreciated by those skilled in the art, the described video amplifier need only operate when it is desired to write an image into the storage tube. For "freezing" a television frame for transmission, the video amplifier is required to be operative for only 1/30 second, while for slow-scan re-creation of the image, the writing into the storage tube is only needed for 60 seconds. Other than these relatively short intervals, the video amplifier can be biased "off" since during such other intervals its operation is only wasteful of power. In accordance with this present invention, the transistor 60 serves as an electronic power switch to supply the $+V_2$ potential to the transistor 20 while the transistor 61 serves as a voltage amplifier to couple a logic level control signal from the terminal 68 to the switch transistor 60.

In operation, logic control circuitry (not shown) senses when the storage tube is to have an image written into it—either in 1/30 seconds or in 60 seconds—and to then provide a positive going control signal at terminal 68. Such signal is in a direction to render transistor 62 conductive, to pull sufficient base current from the switch transistor 62 so as to saturate it. When transistor 60 thus saturates, the $+V_2$ potential source is impressed directly onto the power amplifier transistor 20. The video amplifier is then energized to increase the magnitude of a video signal applied at terminal 10 for amplification, prior to writing onto the storage tube target. At the end of the writing interval, the positive control signal is terminated, thereby biasing transistors 60 and 62 to an "off" condition. During this time, the potential source $+V_2$ is decoupled from transistor 20, and thereby eliminates the power dissipation previously associated with it, and the problems which had ensured when there existed a quiescent dissipation. In those designs where a DC-to-DC converter is used as a power supply for the video circuit module on which the amplifier is incorporated, such elimination of some 3 watts of continuous power permits the converter design to be simplified, in that less expensive transistors and less complicated heat sink configurations need be provided in order to withstand the constant power otherwise being dissipated.

While applicant does not wish to be limited to any particular set of values, the following have proven satisfactory in one operating arrangement of the electronic switch control for the invention.

| Component | Value |
|---|---|
| Resistor 64 | 75K |
| Resistor 66 | 18K |
| Resistor 70 | 3.9K |
| Transistor 60 | 2N4036 |
| Transistor 62 | 2N3440 |
| Potential Source $+V_2$ | +75 volts |
| Potential Source $+V_4$ | +5 volts |

The other values for the components shown in the drawing may be the same as set forth in the U.S. Pat. Ser. No. 398,853 pending application.

While there has been described what is considered to be a preferred embodiment of the present invention for switchably energizing the video amplifier used to write image signals into a storage tube, it will be readily apparent that other modifications may be made by those skilled in the art without departing from the teachings herein.

What is claimed is:

1. In a television image transmission system of the type wherein a single storage device is controllably biased to "write," "read" and "erase" modes of operation both for the selection of a particular frame of television information for transmission to a remote receiver location by an audio communications link and for the reception and re-creation of frame information so transmitted, and in which there is included:

an amplifier stage having an input terminal to which image representative television information is supplied and an output terminal at which amplified versions of said image representative information is developed for application to said storage device for the selection or re-creation of said information dependent upon when said device is operating within said system in the transmitting or receiving mode;

first means for biasing said amplifier stage to develop amplified image representative signals of a first magnitude at its output terminal referenced to a first direct current level;

second means for biasing said amplifier stage to develop amplified image representative signals of a second, different magnitude at its output terminal referenced to a second, different direct current level;

and first control means coupled to said first and second biasing means for conditioning at least one of said biasing means to operation to set the magnitude of developed amplified signals and the direct current level to which said amplified signals are referenced;

said first control means also being dependent upon the mode of operation of said storage device within said television image transmission system to establish Class A amplifier operation and said first signal magnitude and direct current level as a reference when said storage device is employed to select a particular television frame for transmission and to establish Class B amplifier operation and said second signal magnitude and direct current level as a reference when said storage device is employed to re-create a television frame received along said audio communications link;

the combination therewith of:

second control means coupled to said amplifier stage for applying energizing potentials thereto substantially only when said storage device is biased to its "write" mode of operation, and to thereby reduce the quiescent power dissipated within said stage during the "read" and "erase" modes of operation of said device.

2. The combination of claim 1 wherein said amplifier stage includes a pair of transistors coupled in cascade connected, grounded emitter amplifier configurations and wherein said second control means applies said energizing potentials to both of said pair of transistors substantially only during the time at which said storage device is biased to its "write" operational mode.

3. The combination of claim 2 wherein said second control means applies a first energizing potential substantially continuously to the input transistor of said cascade connected pair and applies a second energizing potential to the output transistor of said cascade pair substantially only when said storage device is biased to its "write" mode of operation.

4. The combination of claim 3 wherein said pair of transistors are of opposite polarity type and wherein said second control means includes a third transistor serially coupled between the collector electrode of the output transistor of said cascade connected pair and an included source of energizing potential therefor.

5. The combination of claim 4 wherein there is further included means providing an input signal to bring said third transistor to a conductive state substantially only during the time said storage device is controllably biased to its "write" mode.

* * * * *